S. WHITMARSH.
Heating Stove.
No. 280.
Reissued Oct. 10, 1854.
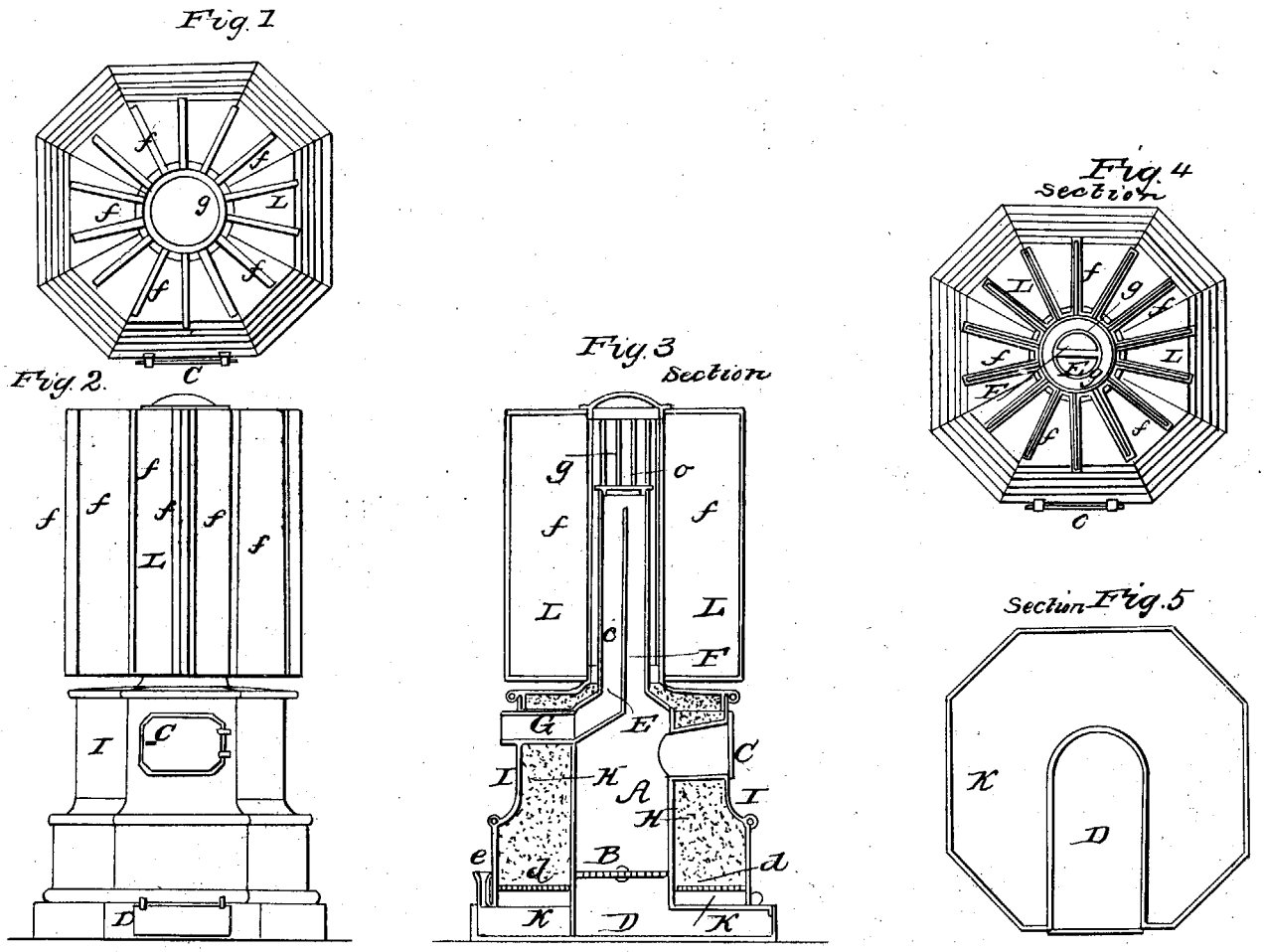
Witnesses
Wm H Bishop
Andrew De Saey
Inventor
Samuel Whitmarsh
N. PETERS, Photo-Lithographer, Washington, D. C.

UNITED STATES PATENT OFFICE.

SAMUEL WHITMARSH, OF NORTHAMPTON, MASSACHUSETTS.

IMPROVEMENT IN CALORIFERES.

Specification forming part of Letters Patent No. 9,206, dated August 17, 1852; Reissue No. 280, dated October 10, 1854.

*To all whom it may concern:*

Be it known that I, SAMUEL WHITMARSH, of Northampton, in the county of Hampshire and State of Massachusetts, have invented a new and useful Improvement in the Method of Generating Steam for Heating Caloriferes, Stoves, or Furnaces for Warming Buildings, but which method is applicable to other purposes; and I do hereby declare that the same is fully described in the following specification and the accompanying drawings, letters, figures, and references thereof.

My invention relates to an improved method of generating steam for any purpose for which steam may be required, but specially for stoves or other apparatus for heating buildings; and it consists in surrounding the fire-chamber in whole or in part, or other portions of the fire-surface, with sand or other granular substance, or other non-combustible substance which in the mass will be porous or cellular, or present interstices between the several particles to contain water when either forced up or drawn up by capillary attraction from a reservoir combined therewith. By this means the heat is absorbed from the fire-surface of the furnace by the surrounding granular or porous substance, and rapidly imparted by the great extent of surface to the water contained in a greatly-subdivided condition in the minute interstices of the surrounding mass.

Of the said drawings, Figure 1 denotes a top view, Fig. 2 a front elevation, Fig. 3 a central and vertical section, of a stove or calorifere made on my improved plan. Fig. 4 is a horizontal section of it taken through the radiator. Fig. 5 is a horizontal section taken through the water-vessel and the ash-pit.

In Fig. 3 of the said drawings, A represents a furnace or chamber for combustion of fuel. B is the grate thereof; C, the opening or passage for supplying the chamber with fuel. D is the ash-pit.

Above and out of the top of the chamber A, I carry a vertical pipe, E, which, by a partition, F, I separate into an ascending and descending smoke-flue, the pipe being covered on its top, as seen at *a*. The partition F is not carried up to the top or cover *a* of the pipe E, but terminates at a short distance therefrom, so as to allow the smoke and volatile products of combustion to pass over it and down the passage *c*, such passage being made to communicate with a discharge-pipe, G.

The entire fire-chamber A, or any suitable part thereof, I inclose in a bed of sand, H H, or other suitable absorbent non-combustible matter, which I place within a case, I, made to surround the fire-chamber in whole or part, as circumstances may require.

Beneath the bed of sand I make a reservoir or chamber, K, for containing water, the sand being made to rest on the top *d* of such chamber K, which should be perforated with numerous fine holes. The top of this reservoir has a tube, *e*, extending above it, through which water may be poured to supply the vessel K, and made to rise above the top surface of the top *d* of it, in order that it may be taken up into the mass of sand by the capillary attraction of the same. The sand-chamber I open into a steam-tight chamber or radiator, L, made in any suitable manner, but if for a heater, so as to expose a large external surface to the atmosphere. In the drawings it is represented as consisting of fourteen metallic chambers, *f f f*, &c., made to radiate from and open into a central chamber, *g*, that surrounds the pipe E. The inner end of each chamber *f f* is open from its top to its bottom, so as to allow a free passage for vapor in the chamber *g* to enter the chamber *f*.

The furnace or chamber of combustion may be constructed of metal or other suitable material.

The operation of the stove or calorifere is as follows: The sand will absorb water and become saturated with it, so as to cause the external surface of the furnace or chamber A to be surrounded by or in contact with a mass of wet sand. The fuel in combustion will heat the sand, so as to cause vapor to form in it, and pass upward and into the radiator, where the heat of such vapor will be abstracted to such extent as to cause the vapor to condense into water, and in such state run back into the sand, where it will be again heated, vaporized, and made to pass into the radiator. By employing a mass of wet sand around the furnace and a condensing-radiator, it will generally be impossible to elevate the water of the sand to a boiling temperature, or one calculated to produce steam of any injurious pressure. The sand absorbs the heat of the furnace and retains it for a great length of time, while it also absorbs and vaporizes, and reabsorbs and revaporizes the water. The mass of sand once saturated with water will require but very little added to it from time to time to provide for the small quantity that may be lost by leakage from any cause. The condensing-radiator may also be filled with sand, if desirable, but I generally prefer to confine the sand to the chamber around the furnace. The air of thea partment in which the stove may be will be warmed by contact with the external sides of the sand-chamber and those of the radiator, and with great economy of fuel, and without danger of any elevation of temperature of the water in the sand to any dangerous extent.

My improvement or principle may be applied to hot-air furnaces for heating several apartments of a building, also to stoves for culinary purposes; and although I have described my invention as applied to a stove or heater for warming apartments, I wish it to be understood that I do not limit myself to such use, as my invention herein-above described is applicable to the generating of steam for any and all purposes for which steam may be required by a merely formal change in the structure of the apparatus to be dictated by the several uses to which it may be applied—as, for instance, when steam is required to be used as a motor, or for any other purposes in which it is required to be used out of the generator. The apparatus is to be provided with the usual or any other suitable means of conducting from the generator to the apparatus in which it is to be used, and so, in like manner, the reservoir of water is to be provided with any of the usual or other appropriate means of feeding or supplying the water as it is evaporated and carried off in the form of vapor, all of which need no special description, as such means and the mode of applying them are well known to engineers, and I have specially described my said invention as applied to caloriferes or stoves, for the reason that the mode of application was not so obvious and required special description.

What I claim as my invention is—

The combination of the water-supply reservoir, the chamber or bed of sand, and a furnace or chamber of combustion, the whole being made to operate substantially as specified.

SAMUEL WHITMARSH.

Witnesses:

WM. H. BISHOP,

ANDREW DE LACY.